(12) United States Patent
Keating et al.

(10) Patent No.: US 10,835,354 B2
(45) Date of Patent: Nov. 17, 2020

(54) SYSTEM AND METHOD FOR REGISTERING IMPLANT ORIENTATION DIRECTLY FROM A DENTAL IMPRESSION

(71) Applicant: Global Dental Science, LLC, Scottsdale, AZ (US)

(72) Inventors: Scott Keating, Louisville, CO (US); Johannes Petrus Michael Grobbee, Tilburg (NL)

(73) Assignee: Global Dental Science LLC, Scottsdale, AZ (US)

( * ) Notice: Subject to any disclaimer, the term of this patent is extended or adjusted under 35 U.S.C. 154(b) by 315 days.

(21) Appl. No.: 15/854,256

(22) Filed: Dec. 26, 2017

(65) Prior Publication Data

US 2018/0116771 A1    May 3, 2018

Related U.S. Application Data

(63) Continuation of application No. 13/830,963, filed on Mar. 14, 2013, now Pat. No. 9,867,684.

(51) Int. Cl.
| | |
|---|---|
| *A61C 13/10* | (2006.01) |
| *A61C 13/20* | (2006.01) |
| *A61C 13/00* | (2006.01) |
| *A61C 13/01* | (2006.01) |
| *A61C 13/08* | (2006.01) |

(52) U.S. Cl.
CPC ...... *A61C 13/1003* (2013.01); *A61C 13/0004* (2013.01); *A61C 13/20* (2013.01); *A61C 13/0003* (2013.01); *A61C 13/01* (2013.01); *A61C 13/08* (2013.01)

(58) Field of Classification Search
None
See application file for complete search history.

(56) References Cited

U.S. PATENT DOCUMENTS

| | | |
|---|---|---|
| 830,887 A | 9/1906 | Robert |
| 2,398,671 A | 4/1946 | Saffir |
| 2,514,076 A | 7/1950 | Kelly |
| 2,602,997 A | 7/1952 | Clawson |
| 3,126,429 A | 3/1964 | Saffir |
| 3,335,495 A | 8/1967 | Theodore |
| 3,458,936 A | 8/1969 | Tuccillo et al. |
| 3,470,614 A | 10/1969 | Kelly |

(Continued)

FOREIGN PATENT DOCUMENTS

| | | |
|---|---|---|
| CN | 1750797 | 3/2006 |
| EP | 1062916 | 12/2000 |

(Continued)

OTHER PUBLICATIONS

EP Application 11838843.8—EPO Search Report dated Mar. 4, 2014.

(Continued)

*Primary Examiner* — Benjamin A Schiffman
(74) *Attorney, Agent, or Firm* — Derrick Harvey, Harvey Law

(57) ABSTRACT

A layered denture having at least one of an integrated layer, balanced occlusion, and a root approximating structure is disclosed. The resulting denture may be suitable for use without an underlying reinforcement bar and may provide enhanced aesthetics by approximating natural dentition and roots both above and below the gum line.

20 Claims, 16 Drawing Sheets

(56) References Cited

U.S. PATENT DOCUMENTS

| | | |
|---|---|---|
| 3,518,761 A | 7/1970 | Susman et al. |
| 3,644,996 A | 2/1972 | Weinkle |
| 3,667,123 A | 6/1972 | Huey |
| 3,702,027 A | 11/1972 | Marshall et al. |
| 3,727,309 A | 4/1973 | Huey |
| 3,813,777 A | 6/1974 | VanHandel et al. |
| 3,839,796 A | 10/1974 | Dimmer et al. |
| 3,846,911 A | 11/1974 | Wichner |
| 3,908,272 A | 9/1975 | Arnold |
| 3,937,773 A | 2/1976 | Huffman |
| 3,987,546 A | 10/1976 | Trampe |
| 4,029,632 A | 6/1977 | Gross et al. |
| 4,115,488 A | 9/1978 | Colpitts |
| 4,247,287 A | 2/1981 | Gigante |
| 4,398,884 A | 8/1983 | Huffman |
| 4,533,325 A | 8/1985 | Blair |
| 4,575,340 A | 3/1986 | Lustig |
| 5,030,102 A | 7/1991 | Lang |
| 5,169,309 A | 12/1992 | Staubli et al. |
| 5,234,339 A | 8/1993 | Grigereit |
| 5,452,219 A | 9/1995 | Dehoff et al. |
| 5,676,546 A | 10/1997 | Heitmann et al. |
| 5,718,584 A | 2/1998 | Wong |
| 5,730,825 A | 3/1998 | Atake |
| 5,775,899 A | 7/1998 | Huffman |
| 5,885,078 A | 3/1999 | Cagna et al. |
| 5,934,906 A | 8/1999 | Phimmasone |
| 5,985,170 A | 11/1999 | Inaba et al. |
| 6,030,218 A | 2/2000 | Robinson |
| 6,116,070 A | 9/2000 | Oshida |
| 6,126,445 A | 10/2000 | Willoughby |
| 6,139,322 A | 10/2000 | Liu |
| 6,227,851 B1 | 5/2001 | Chishti |
| 6,257,895 B1 | 7/2001 | Oestreich |
| 6,384,107 B2 | 5/2002 | Liu |
| 6,788,986 B1 | 9/2004 | Traber et al. |
| 6,814,575 B2 | 11/2004 | Poirier |
| 7,153,136 B2 | 12/2006 | Thomas |
| 7,530,810 B2 | 5/2009 | Clement |
| 7,653,455 B2 | 1/2010 | Cinader, Jr. |
| 7,704,076 B2 | 4/2010 | Mullaly |
| 7,758,346 B1 | 7/2010 | Letcher |
| 7,806,691 B2 | 10/2010 | Berger |
| 7,854,611 B2 | 12/2010 | Yau et al. |
| 7,901,209 B2 | 3/2011 | Saliger et al. |
| 7,943,068 B2 | 5/2011 | Panzera |
| 7,950,924 B2 | 5/2011 | Brajnovic |
| 8,567,408 B2 | 10/2013 | Roettger |
| 8,641,938 B2 * | 2/2014 | Howe ............ A61C 9/0053 264/16 |
| 8,875,398 B2 | 11/2014 | Balshi et al. |
| 9,155,599 B2 | 10/2015 | Thompson et al. |
| 9,192,456 B2 | 11/2015 | Howe |
| 9,213,784 B2 | 12/2015 | Thompson et al. |
| 9,364,302 B2 | 6/2016 | Thompson et al. |
| 9,402,698 B2 | 8/2016 | Thompson et al. |
| 9,468,509 B2 | 10/2016 | Howe |
| 9,492,252 B2 | 11/2016 | Howe |
| 9,610,145 B2 | 4/2017 | Howe |
| 9,662,189 B2 | 5/2017 | McDermott |
| 9,717,572 B2 | 8/2017 | Thompson et al. |
| 9,744,010 B2 | 8/2017 | Thompson et al. |
| 9,867,684 B2 | 1/2018 | Grobbee et al. |
| 10,206,764 B2 | 2/2019 | Grobbee et al. |
| 10,251,733 B2 | 4/2019 | Grobbee |
| 2003/0138756 A1 | 7/2003 | Monkmeyer |
| 2003/0162147 A1 | 8/2003 | Dequeker |
| 2004/0185422 A1 | 9/2004 | Orth et al. |
| 2014/0080094 A1 | 3/2014 | Howe |
| 2014/0099600 A1 | 4/2014 | Harrison |
| 2014/0234802 A1 | 8/2014 | Howe |
| 2014/0272777 A1 | 9/2014 | Howe |
| 2014/0272798 A1 | 9/2014 | McDermott et al. |
| 2014/0272800 A1 | 9/2014 | Howe |
| 2015/0010885 A1 | 1/2015 | Balshi et al. |
| 2015/0111177 A1 | 4/2015 | Fisker et al. |
| 2015/0182316 A1 | 7/2015 | Morales et al. |
| 2015/0327961 A1 | 11/2015 | Thompson et al. |
| 2016/0008108 A1 | 1/2016 | Thompson et al. |
| 2016/0089221 A1 | 3/2016 | Christen et al. |
| 2017/0014212 A1 | 1/2017 | Fischer |
| 2017/0112599 A1 | 4/2017 | Balshi |
| 2017/0325920 A1 | 11/2017 | Ginsburg et al. |

FOREIGN PATENT DOCUMENTS

| | | |
|---|---|---|
| EP | 1252867 | 7/2016 |
| EP | 3348228 | 7/2018 |
| FR | 2035133 | 12/1970 |
| WO | WO1991007141 | 5/1991 |
| WO | WO2003024352 | 3/2003 |
| WO | WO2004060197 | 7/2004 |
| WO | WO2009105661 | 8/2009 |
| WO | WO2009105700 | 1/2010 |
| WO | WO2012030493 | 3/2012 |
| WO | WO2014130536 | 10/2014 |
| WO | WO2014159436 | 10/2014 |
| WO | WO2015031062 | 3/2015 |

OTHER PUBLICATIONS

EP Application 14764979.4—EPO Search Report dated Sep. 7, 2016.

EP Application 14774571.5—EPO Search Report dated Aug. 12, 2016.

EP Application 15156818.6—EPO Search Report dated Jun. 18, 2015.

EP Application 16184888.8—EPO Search Report dated Jan. 12, 2017.

PCT Application PCT/US2014/051008—International Search Report ad Written Opinion dated Nov. 20, 2014.

PCT Application PCT/US2014/051008—Preliminary Report on Patentability dated Mar. 1, 2016.

Positioning handle and occlusal locks for the Teeth-in-a-Day protocol:, The Journal of Prosthetic Dentistry, 2016, Balshi et al., p. 274-278.

"A New Protocol for Immediate Functional Loading of Dental Implants", Dentistry Today, Balshi et al., Sep. 2001, vol. 20, No. 9.

"CAD and CAM—possibilities of optimization in total prosthetics (I)", Quintessenz, Becker, Apr. 1991, Issue 4, p. 397 to 404.

"Geroprosthetics; Age-appropriate prosthesis design with heart and mind,"ZTM Aktuell, Maas, Jul. 2010.

N. Savic, PalaDigtal.com, "My Digital Denture," Supplement to Inside Dental Technology magazine, Aegis Communications, Mar. 2017.

AvaDent product information printed on May 15, 2017 from Avadent website; posting date unknown.

Morales et al., "A Digital Spin on Traditional Dentures," Chairside Magazine, vol. 11, Issue 4, Glidewell Laboratories, Mar. 27, 2017.

U.S. Appl. No. 12/939,138—Advisory Action dated Nov. 23, 2015.

U.S. Appl. No. 12/939,138—Notice of Allowance dated Mar. 14, 2016.

U.S. Appl. No. 12/939,141—Restriction Requirement dated Apr. 9, 2015.

U.S. Appl. No. 12/939,141—Non-Final Office Action dated Jul. 12, 2016.

U.S. Appl. No. 12/939,141—Final Office Action dated Oct. 5, 2017.

U.S. Appl. No. 13/823,621—Non-Final Office Action dated Oct. 23, 2014.

U.S. Appl. No. 13/823,621—Notice of Allowance dated Jun. 22, 2015.

U.S. Appl. No. 14/195,348—Non-Final Office Action dated Aug. 21, 2014.

U.S. Appl. No. 14/195,348—Final Office Action dated Oct. 21, 2014.

U.S. Appl. No. 14/195,348—Non-Final Office Action dated Dec. 19, 2014.

U.S. Appl. No. 14/195,348—Final Office Action dated Apr. 18, 2016.

(56) References Cited

OTHER PUBLICATIONS

U.S. Appl. No. 14/195,348—Non-Final Office Action dated Dec. 30, 2016.
U.S. Appl. No. 14/195,348—Final Office Action dated Aug. 18, 2017.
U.S. Appl. No. 14/195,348—Notice of Allowance dated Nov. 30, 2018.
U.S. Appl. No. 14/195,348—Notice of Allowance dated Jan. 18, 2019.
U.S. Appl. No. 14/506,338—Non-Final Office Action dated Apr. 7, 2017.
U.S. Appl. No. 14/506,338—Notice of Allowance dated Oct. 17, 2018.
U.S. Appl. No. 14/798,717—Restriction Request dated Aug. 17, 2017.
U.S. Appl. No. 14/798,717—Non-Final Office Action dated Sep. 26, 2018.
U.S. Appl. No. 14/821,097—Restriction Request dated Jan. 4, 2016.
U.S. Appl. No. 14/798,717—Restriction Requirement dated Aug. 17, 2017.
U.S. Appl. No. 14/821,097—Restriction Requirement dated Jan. 4, 2016.
U.S. Appl. No. 14/821,097—Non-Final Office Action dated Jun. 28, 2016.
U.S. Appl. No. 14/821,097—Notice of Allowance dated Apr. 20, 2017.
U.S. Appl. No. 15/152,521—Restriction Requirement dated Aug. 21, 2017.
U.S. Appl. No. 15/284,481—Restriction Requirement dated Dec. 28, 2017.
U.S. Appl. No. 15/284,481—Non-Final Office Action dated Sep. 26, 2018.

* cited by examiner

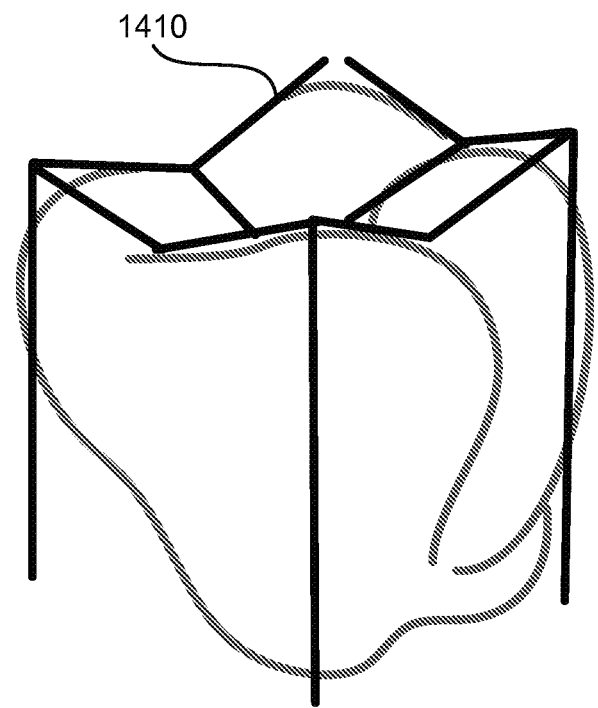
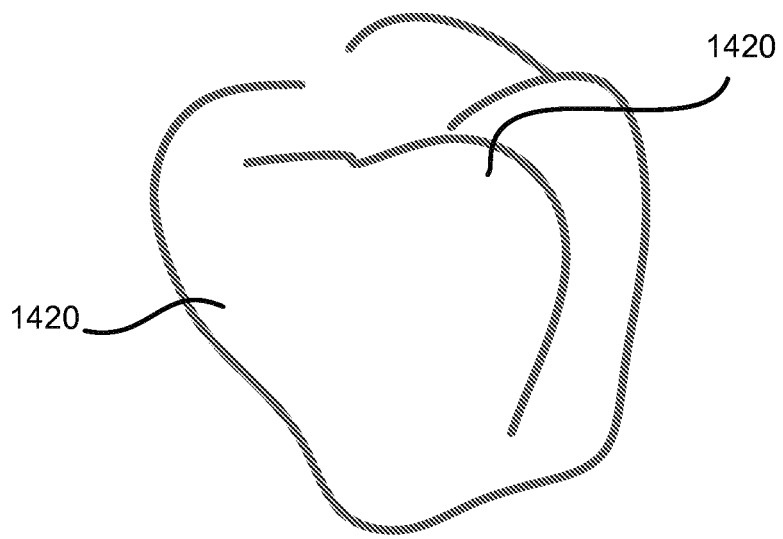
FIG.14

US 10,835,354 B2

SYSTEM AND METHOD FOR REGISTERING IMPLANT ORIENTATION DIRECTLY FROM A DENTAL IMPRESSION

RELATED APPLICATION

This application is a Continuation to U.S. application Ser. No. 13/830,963 filed on Mar. 14, 2013 and entitled "System and Process for Manufacturing of Dentures."

FIELD OF THE INVENTION

The present invention relates to the field of manufacturing dentures. More particularly, the present invention relates to manufacturing of dentures having multiple material layers.

BACKGROUND OF THE INVENTION

Dentures have been manufactured for centuries to replace all or part of an individual's dentition. Dentures have been manufactured by molding the denture from casts made of the patient's edentulous or partially edentulous ridges. The manufacturing process may begin with a preliminary impression of the patient's mouth, which is usually done in silicone or alginate. This impression may be used to prepare a diagnostic cast. While making the impression, the dentist applies pressure to the soft tissues to simulate biting force and extends the borders of the mold to adjacent toothless areas to allow the dentures to better adapt to the gums. A final cast may then be formed from gypsum based on the diagnostic cast. The final cast may be filled or "waxed up" to form the denture. The denture teeth will be set in the wax. The cast with the waxed denture will be placed in a mold and injected or packed with acrylic. Once the resin has cured, the cast may be broken apart and the denture may be removed.

More recently, dentures have been manufactured by machining a void in a block of denture base material formed to match the contour of natural teeth as arranged on a maxilla or on a mandible; filling the void with a synthetic tooth material; removing a portion of the synthetic tooth material; and potentially filling the void and removing a portion of material a second time in order to create denture having teeth made of one or potentially two or more layers.

While machining has been used to form the basic shapes of dentures and denture teeth, prior innovations fail to adequately address the aesthetics and function of the denture, particularly the aesthetics at and below the gum line. For example, in a traditional denture the denture teeth mimic the appearance of a natural tooth only above the gum line because traditional denture teeth adhere to a denture baseplate rather than extending into the baseplate with roots, as would real teeth. Traditional denture teeth are made in standard shapes using injection molding or pressure molding techniques. Anatomical roots are not incorporated in these teeth because of manufacturing difficulties. Currently, a dental technician may festoon root structures in the denture base and use different coloring techniques to paint the dental base to simulate the roots. This requires additional cost, delay, and expense and does not aesthetically mimic a natural tooth as completely as an anatomical root would. Thus, there is a need for a denture having a more natural structure that will exhibit an improved aesthetic appearance.

Prior innovations also fail to adequately address the function of traditional dentures with traditional denture teeth. Dentures need to be balanced to avoid the patient's denture becoming loose or unstable during the protrusive and lateral movement of the mandible. This often requires grinding the occlusal surface of the denture teeth until the dentures remain in contact on at least three points throughout much of the movement of the mandible. Traditionally, a denture technician will set up the denture in an articulator and grind the teeth until the occlusive design of the denture is balanced. However, grinding the teeth will take away the enamel layer of the teeth, diminishing the aesthetic appearance of the teeth and functionally weakening the teeth. Thus, there is also need for a denture which is balanced, yet with unground occlusal surface (enamel) so that the denture has a more natural structure that will exhibit an improved aesthetic appearance and will not suffer from weakening of the enamel due to grinding.

Furthermore, in many dentures, a metal bar often sits beneath the denture base to enhance stability and strength. Often if the denture is implant supported, the denture is installed without the bar structure until such time as the patient has healed from the surgery enough so that the inflammation or swelling of the patient's soft tissue has receded to allow the bar structure to fit beneath the denture base. Then a modified denture must be reinstalled, with the bar structure. Furthermore, denture acrylics are often not strong enough to sustain bite forces, thus the base is often mounted on a bar to distribute the forces. This bar can be undesirable due to the associated bulk, cost, weight, and production delay and expense. Thus, there is yet another need for a denture having a reinforcement structure but without the bulk, cost, weight, production delay and expense associated with the bar structure.

Accordingly, there remains a need for a denture that more closely simulates natural mouth structures, providing both structural and aesthetical improvements and which, in the case of implant-supported dentures, does not require a follow up procedure to insert a separate bar beneath the denture.

SUMMARY OF THE INVENTION

In accordance with various aspects of the present invention, an improved layered denture is provided. In accordance with an exemplary embodiment, a method for manufacturing a layered denture may comprise the steps of A) configuring a base from a first material to form a first pocket; B) filling a first tooth dentition material into said first pocket; machining said first tooth dentition material to form a dentin layer; C) filling a second tooth dentition material into said first pocket; D) configuring said second tooth dentition material to form an enamel layer; and E) defining a motion envelope of a mandible of a patient that is in accordance with a three-dimensional file of the patient so that the dentin layer is offset according to the motion envelope to provide sufficient spacing to achieve balanced occlusion, the step of defining the motion envelope may further comprise electronically modeling the dentin layer and enamel layers according to the motion envelope, whereby a shape of an outer surface of the enamel layer may correspond to the defined motion envelope, the step of defining the motion envelope is further defined in protrusion comprising at least one of the constraints of centric relation and edge-to-edge central incisors, and incisal guidance and condylar shape; the step of defining the motion envelop may be further defined in laterotrusion comprising at least one of the constraints of vertical alignment of buccal cusps of posterior teeth, and canine guidance and condylar shape; the method may further comprise configuring a second pocket in the base; and filling a reinforcement material in the second pocket to form a support layer; the step of filling a remaining cavity within the second pocket with a second material that comprises a covering layer; the step of configuring the first pocket results in the first pocket resembling a root of a tooth; further comprising the step of filling a simulated root material into said first pocket, wherein the shape of at least one of the first pocket and the simulated root material is configured to provide sufficient spacing to achieve balanced occlusion, wherein a shape of an outer surface of the enamel layer corresponds to the motion envelope; wherein a gum line on an exterior of the layered denture established, the simulated root material extending below the gum line; the step of filling a simulated root material into the first pocket, wherein said simulated root material is machined to provide at least one of a dentin layer or an enamel layer, or a root approximating structure; wherein the step of machining said first tooth dentition material to form a dentin layer or the step of filling a simulated root material into the first tooth pocket wherein said simulated root material is machined may be machined in accordance with three-dimensional digital images of the patient; wherein three-dimensional digital images of the patient may be at least one of digital scanning of the patient, a patient's dentures, and bite impressions of the patient; wherein the first dentition material may be different than the second dentition material.

In accordance with an exemplary embodiment, a method for manufacturing a layered denture may comprise A) configuring a base from a first material to form a first pocket; B) filling a first tooth dentition material into said first pocket; machining said first tooth dentition material to form a simulated root structure layer and at least part of a dentin layer; C) filling a second tooth dentition material into said first pocket; D) configuring said second tooth dentition material to form an enamel layer; and defining a motion envelope of a mandible of a patient that is in accordance with a three-dimensional file of the patient so that the simulated root structure and at least part of a dentin layer is offset according to the motion envelope to provide sufficient spacing to achieve balanced occlusion; wherein the shape of at least one of the first pocket and the simulated root material may be configured to provide sufficient spacing to achieve balanced occlusion, wherein a shape of an outer surface of the enamel layer corresponds to the motion envelope; the step of defining the motion envelope is further defined in protrusion comprising at least one of the constraints of centric relation and edge-to-edge central incisors, and incisal guidance and condylar shape; the step of defining the motion envelop may be further defined in laterotrusion comprising at least one of the constraints of vertical alignment of buccal cusps of posterior teeth, and canine guidance and condylar shape; wherein a gum line on an exterior of the layered denture established, the simulated root material extending below the gum line; the step of filling a simulated root material into the first pocket, wherein said simulated root material is machined to provide at least one of a dentin layer or an enamel layer, or a root approximating structure; wherein the simulated root material may be a different material than that of the second dentition layer.

In accordance with an exemplary embodiment, a layered denture may be manufactured by iteratively adding layers to cavities or pockets in the denture base and then removing portions of the layers to create portions of the teeth, roots of teeth, reinforcement structures, or other features of the denture. Different layers can be formed from different materials having different strengths, colors, translucency and other material properties. Furthermore, a layered denture may be manufactured according to electronic models, such as three-dimensional digital images, wherein the design of the dentition is adjusted to achieve balanced occlusion.

In accordance with an exemplary embodiment, the material removing operations can be performed in accordance with three-dimensional digital images to create realistic dentures. The three-dimensional digital images can be created from the patient using combinations of digital scanning and bite impressions.

In accordance with an exemplary embodiment, a layered denture may be configured to approximate roots of teeth. The base may have pockets configured to simulate roots when filled with a material. For example, a material may be filled in a pocket resulting in a root approximating structure so that the denture has a more realistic appearance.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 13-14 illustrate exemplary artificial dentition structures;

DESCRIPTION OF THE EXAMPLE EMBODIMENTS

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for manufacturing and construction may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical method of construction.

Figure 1:
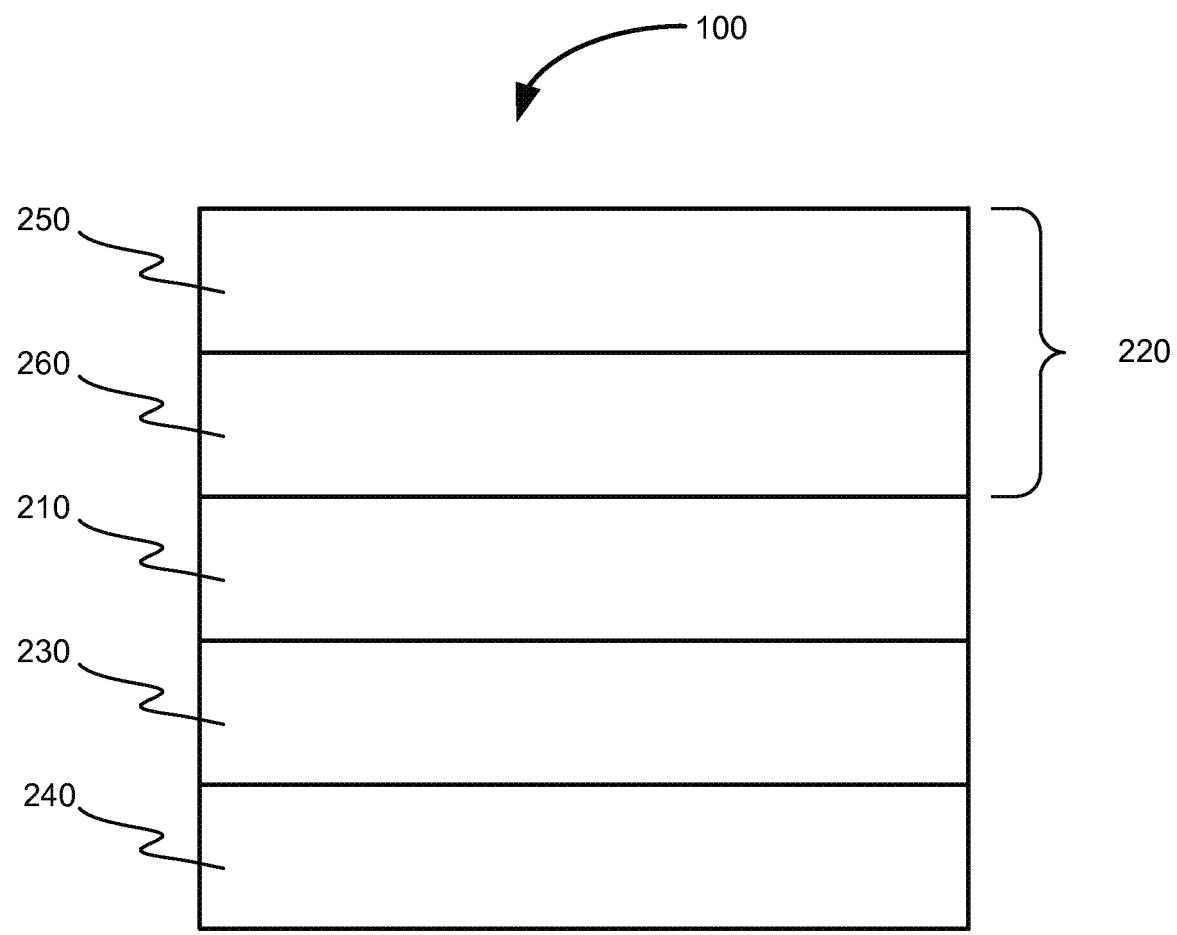
FIG. 1 is a section view of an example embodiment of a layered denture.
Figure 2:
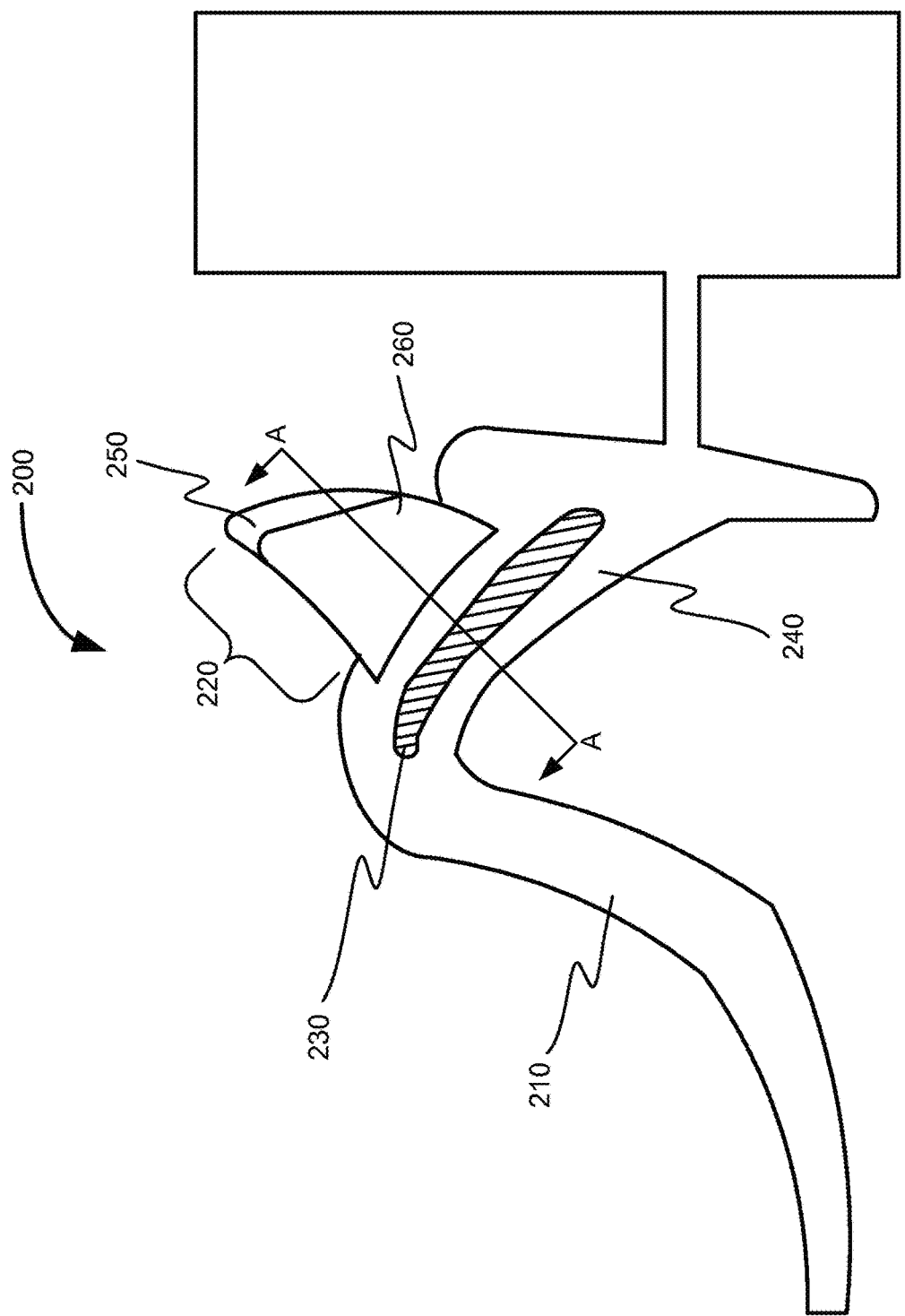
FIG. 2 is a side view of an example embodiment of a layered denture.
Figure 3:
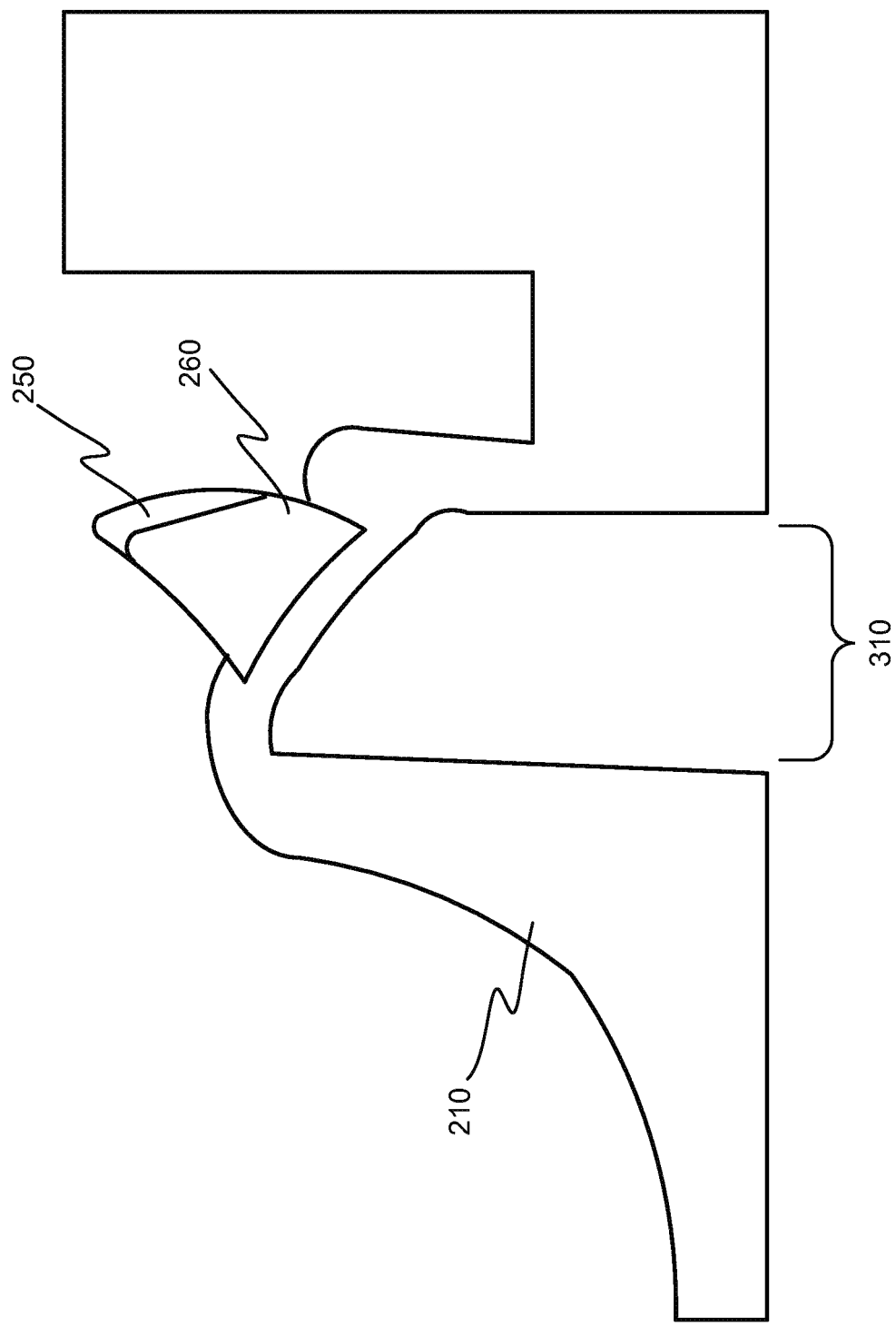
FIGS. 3-6 are side views of an exemplary layered denture at different points in an exemplary manufacturing process.
Figure 4:
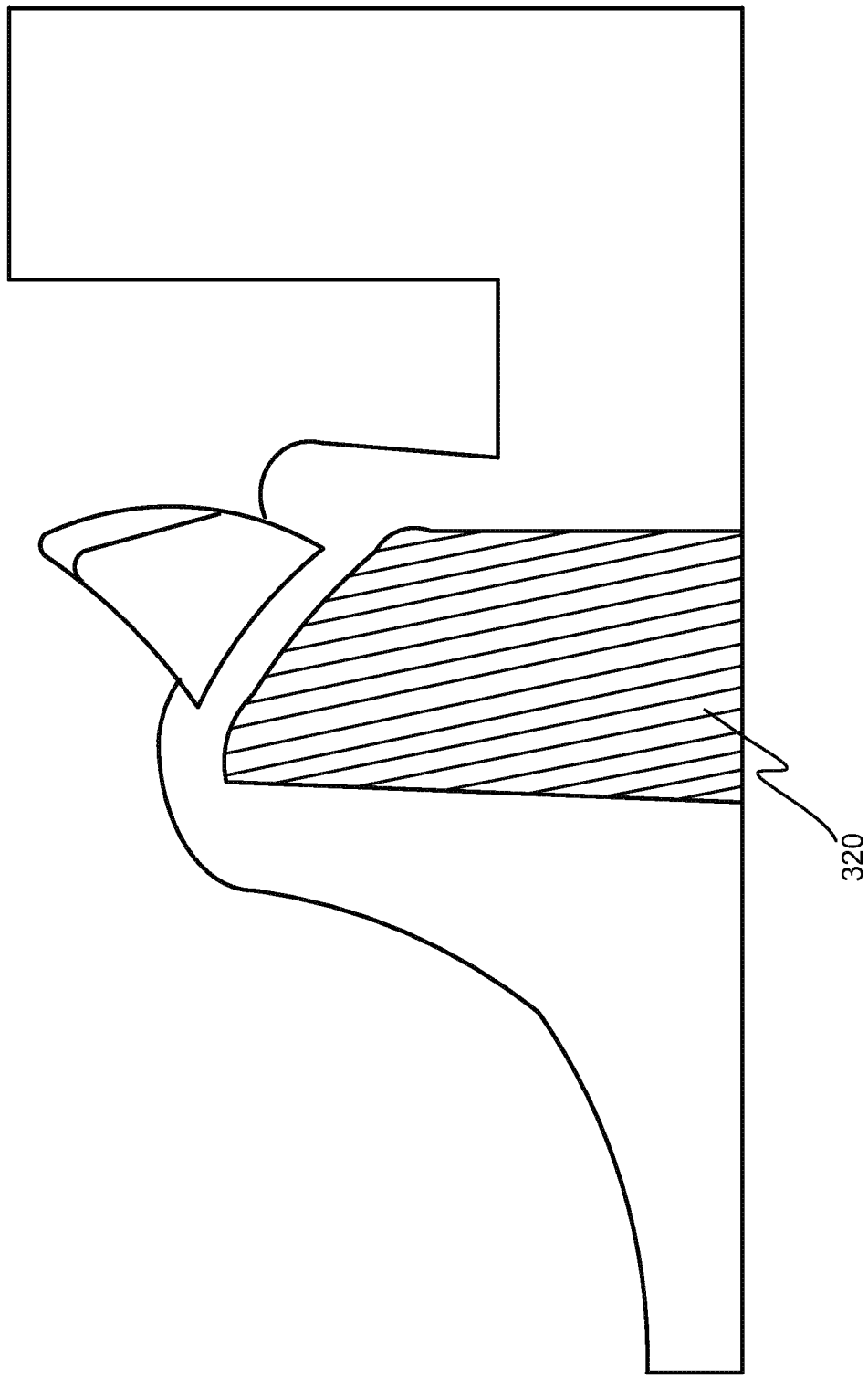
Figure 5:
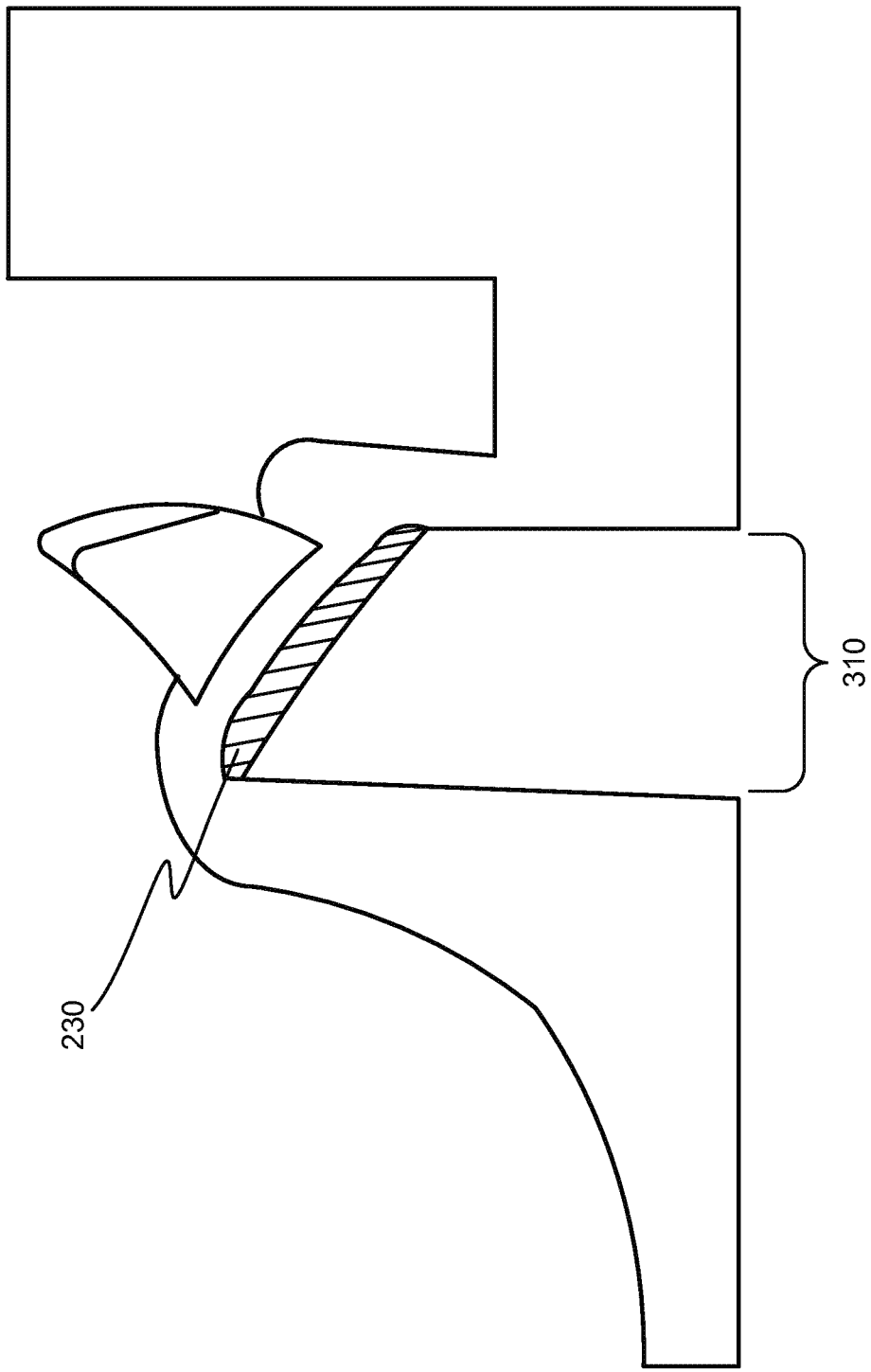
Figure 6:
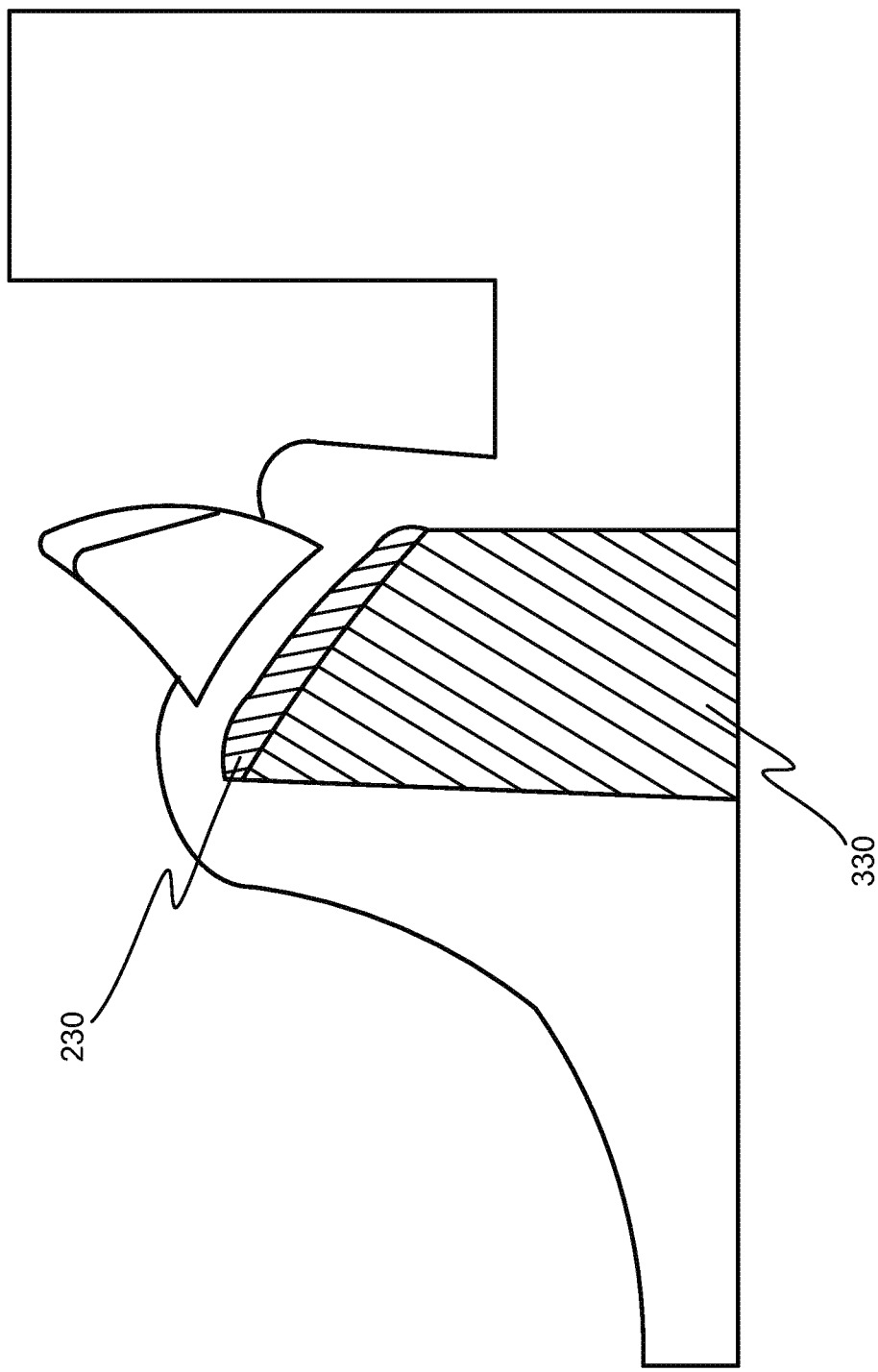

Now, with reference to FIGS. 1 and 2, a section view 100 along line A-A is provided of one example embodiment of a layered denture 200 comprising a base 210 comprising a first material having a first pocket and a second pocket; an artificial dentition structure 220 in said first pocket wherein said first pocket is configured to support said artificial dentition structure; a reinforcement material wherein said reinforcement material may be filled into a second pocket and machined to provide a support layer 230; and a second material wherein said second material may be filled into said second pocket in a remaining cavity realized after machining of said support layer, said second material further machined to form a covering layer 240. In one example embodiment said covering material is substantially identical to said first material and said covering material integrates into base 210 to form a unitary structure enveloping support layer 230 (for example, see FIG. 2).

In one example embodiment, said base 210 comprises a hardened polymethyl methacrylate (PMMA) material. However, said base may comprise any material having sufficiently low porosity so as to be hygienic for extended placement in a wearer's mouth. For example, said base may be made of a plastic, ceramic, metal, or acrylic, including for instance, a polymer, monomer, composite, or alloy.

Furthermore, said base and any other components of a layered denture 200 may be formed according to a process and system for molding or forming products from thermosetting plastics. Such a system may utilize a deformable container that is placed within the cavity of a housing of a mold with resins and initiator mixed therein. As a piston slides into the cavity, the upper edges of the container may engage between the housing and the piston to seal the housing from leakage. The pressure of the piston along with heat on the housing may enable the curing process to be controlled to maximize compression and minimize porosity. Exemplary processes and systems disclosed in U.S. patent application Ser. No. 13/369,238, entitled "Processes and Systems for Molding Thermosetting Plastics" are incorporated by reference.

Furthermore, said base 210 comprising a first material may have a first pocket and a second pocket. Said first pocket and said second pocket may be machined by a CAD/CAM machining device, although any process suited for accurate forming of the material may be utilized. For example, said first pocket and said second pocket may be formed by machining, etching, waterjet, laser cutting, 3D printing, or chemical mask processes.

In one example embodiment, a layered denture 200 may have an artificial dentition structure 220. In one example embodiment, this structure may be at least one tooth. Said tooth may be constructed according to the principles described herein wherein a first tooth dentition material is filled into the first pocket of base 210 and machined to form a dentin layer 260 and a second tooth dentition material is filled into said first pocket of base 210 and machined to provide an enamel layer 250. The dentin layer 260 may comprise acrylic though any suitable material may be used. The enamel layer 250 may comprise high impact acrylic though any material adapted to be wear and abrasion resistant may be used. In some example embodiments, the dentin layer 260 and/or the enamel layer 250 comprise materials processed by exemplary processes and systems disclosed in U.S. patent application Ser. No. 13/369,238, entitled "Processes and Systems for Molding Thermosetting Plastics," which are incorporated by reference. In some example embodiments these exemplary processes and system enhance the durability of the acrylic or other materials comprising the dentin layer 260 and/or enamel layer 250. In some example embodiments, said artificial dentition structure 220 is electronically defined to achieve balanced occlusion, in accordance with the principles disclosed herein. For example, at least one layer of said artificial dentition structure may be offset to accommodate an enamel layer.

Now, with reference to FIG. 2, in one embodiment of a layered denture 200, covering layer 240 and base 210 are machined to conform to the geometry of a wearer's natural dentition.

As discussed in the background, a metal reinforcement bar may be used to provide reinforcement support to a denture; however, in accordance with the principles disclosed herein, a layered denture 200 may instead comprise a support layer 230 to provide reinforcement support to a layered denture. Said support layer 230 may comprise carbon fiber, though it may alternatively comprise numerous other materials configured to provide support, such as, for example, a Kevlar-brand material, Dynema-brand material, Aramid-brand material, alloy, glass, binder, epoxy, polyester, acrylic, or any material or combination of materials having a desired strength, stiffness, or flexibility sufficient to reinforce said denture. In still other embodiments, layered denture 200 may comprise a plurality of support layers.

In some embodiments, support layer 230 may lie generally parallel to the mandibular or maxillary plane. In other embodiments, support layer 230 may lie generally normal to the mandibular or maxillary ridge, or at any angle with respect to the mandibular ridge or the maxillary ridge. Furthermore, support layer 230 may be non-continuous along the denture. Some embodiments may combine features of various exemplary embodiments.

In some embodiments, a support layer 230 may comprise multiple materials, or any material configuration suitable to enhance or reinforce the resiliency and/or support of the layered denture when subjected to wear in a wearer's mouth or to satisfy other desired chemical, physical, or biological properties. Furthermore, a support layer may comprise materials with differing grain structures or grain direction or with similar grain structures or grain direction or any grain structure or direction suitable for achieving desired properties in the layered denture 200; for example, resiliency undue torsional loads. In some embodiments, a support layer 230 may be comprised of carbon, a Kevlar-brand material, Dynema-brand material, Aramid-brand material, alloy, glass, binder, epoxy, polyester, acrylic, or any material or combination of materials suitable for achieving desired properties in the layered denture 200.

A support layer 230 may also be made of materials with differing or similar visual and aesthetic features, such as color, translucency, or gloss, or any visual or aesthetic feature to simulate natural dentition of the patient.

In some example embodiments, the materials comprising a support layer may be self-cured, heat-cured, radiation-cured, or illumination-cured, or otherwise rendered solid by any other method. In some example embodiments, the materials comprising a support layer may be cured in accordance with exemplary processes and systems disclosed in U.S. patent application Ser. No. 13/369,238, entitled "Processes and Systems for Molding Thermosetting Plastics" are incorporated by reference.

Now, with reference to FIGS. 3-6, a layered denture may be manufactured by a process for manufacturing a layered denture 200 comprising machining a base 210 wherein said machining forms a pocket 310 in said base, filling a second material 330 into said second pocket 310 into a remaining cavity realized after machining of said support layer 230, said second material further machined to form a covering layer (See FIG. 2; 240). However, in exemplary embodiments wherein support layer includes a reinforcement material 320 comprising a layer fabric or other similar construction, the process of machining said reinforcement material can be eliminated.

Figure 11:
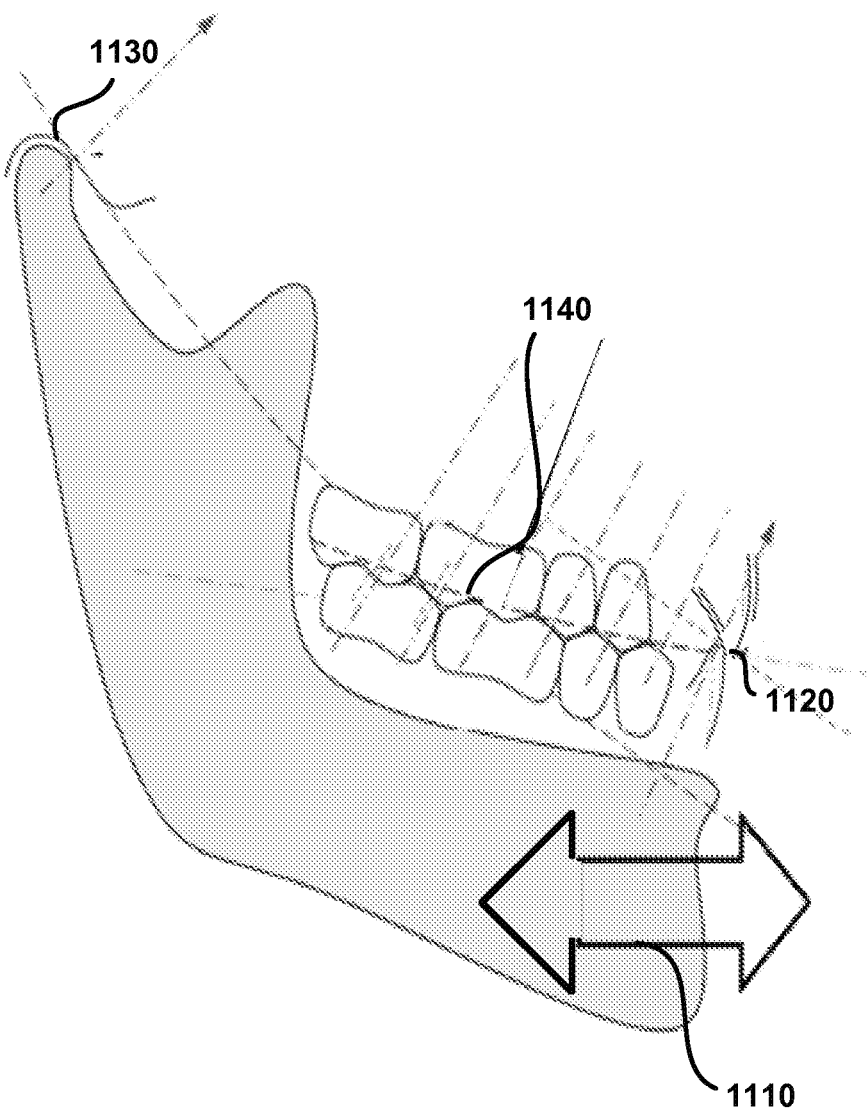
FIGS. 11-12 illustrate an exemplary balanced occlusion motion envelope defined in protrusion and laterotrusion.
Figure 12:
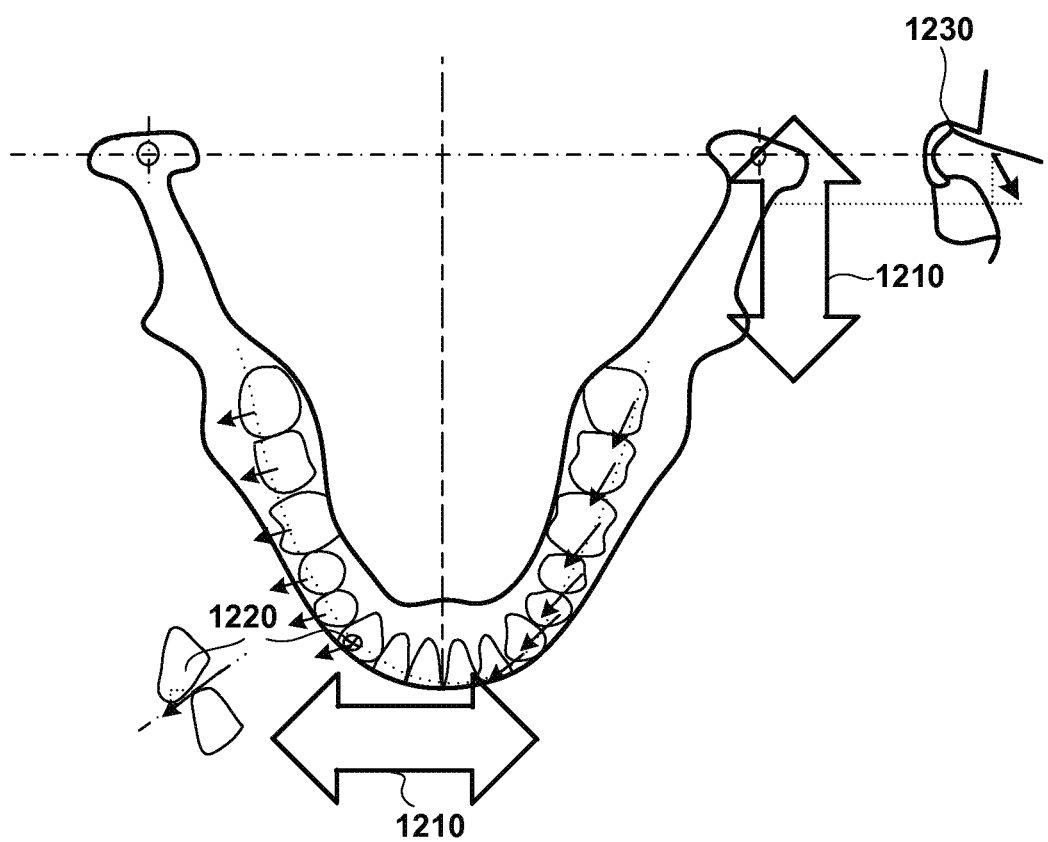

In one example embodiment, said machining is in accordance with a three-dimensional file of the patient's anatomy. For example, in one example embodiment, a layered denture 200 may be manufactured with consideration for balanced occlusion of the layered denture when used by a denture user. In one embodiment, artificial dentition structure 220 is electronically defined by computer modeling wherein each layer is designed by defining the motion envelope of the user's mandible and each layer is shaped to accommodate that motion while remaining in contact through much or all of the motion. In one example embodiment, each layer may be defined by prismatic or other geometry. Furthermore, with reference to FIGS. 11 and 12, in one example embodiment, the motion envelope may be defined in protrusion 1110 from centric relation (mandible fully retracted) to protrusion where the central incisors are edge-to-edge. In one example embodiment, the motion envelope may be defined in laterotrusion 1210 where the buccal cusps of the posterior teeth are vertically aligned. Among other possible constraints, the mandible motion may be constrained in protrusion by incisal guidance 1120 and condylar shape 1130 and in laterotrusion by canine guidance 1220 and condylar shape 1230.

Figure 13:
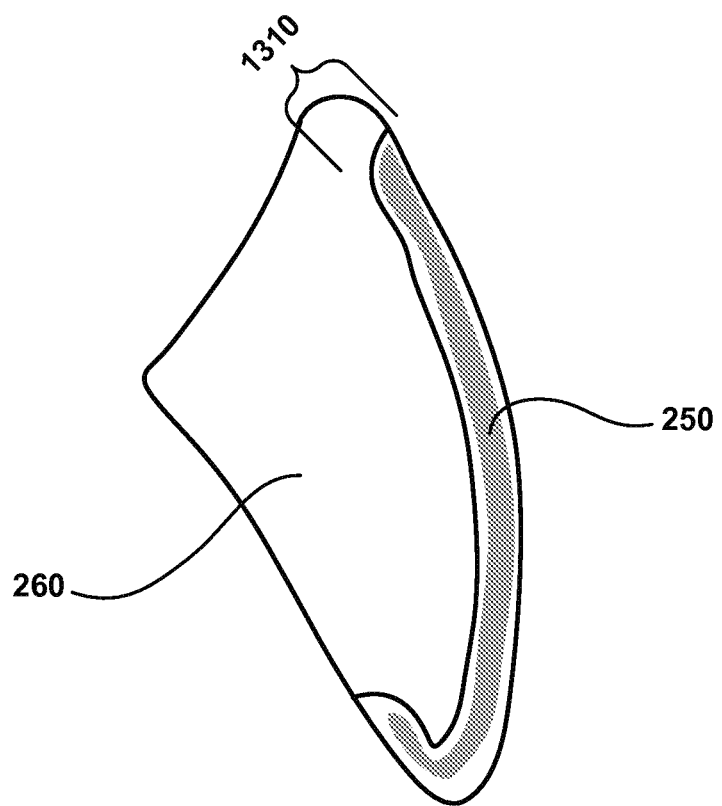

With reference to FIGS. 2 and 14, in one example embodiment, the shape of artificial dentition structures 1410 is defined for the mandible motion envelope and the thickness and shape of dentin portion 260 of an artificial dentition structure 220 is offset (See FIG. 13; 1310) to provide sufficient spacing for balanced occlusion to be achieved upon the formation of enamel layer 250. Thus, both dentin portion 260 and enamel layer 250 of an artificial dentition structure 220 may be electronically defined and may be built based on digital images of the patient's anatomy which takes account of the mandible motion envelope and the offsets to achieve balanced occlusion. In one example embodiment, no grinding on the occlusal surface (See FIG. 11; 1140) of the enamel layer 250 will be required, due, for example, to this offsetting (See FIG. 13, 1310). In one example embodiment, this may result in a more aesthetically pleasing layered denture wherein the denture does not exhibit localized weakening due to grinding away of material. In one example embodiment, additional tooth morphology 1420 may be added, for example, for aesthetic purposes or for any other purpose.

An exemplary manufacturing process may proceed by iterative steps of machining pockets, then filling the machined pockets with a material, then machining the filled material to create a layer. In other exemplary manufacturing processes, multiple steps of machining and filling may occur in parallel, for example, at different locations or surfaces of the layered denture. In some example embodiments, at least one of dentin portion 260 and enamel layer 250 may be formed by machining or by 3D printing. In some example embodiments, additional material, for example, bonding material, is filled over a layer and machined, although any manufacturing process causing adhesion or bonding between layers may be utilized. In some embodiments, a layered denture may comprise multiple layers, although any number of layers suitable to form the denture as desired may be implemented.

The process for manufacturing layered dentures may be implemented by an apparatus as describing below. Moreover, it is to be expressly understood that any other systems or apparatus may also implement the process of the present invention.

In one instance, a fixture for holding the layered denture during manufacturing may be located adjacent to a material removing device. In some instances, the material removing device is a CNC or a CAD/CAM mill, although the material removing device can be a mill, grinder, laser cutter, or any other suitable device for forming the structures of the layered denture. In some instances, the material removing device and the fixture are movable relative to one another. In some instances, adjacent to the fixture may be at least one material delivery device to deliver raw material for the filling process described herein. Now, having discussed manufacturing of the reinforcement aspects, a layered denture may be further improved by adding a simulated root structure.

Figure 7:
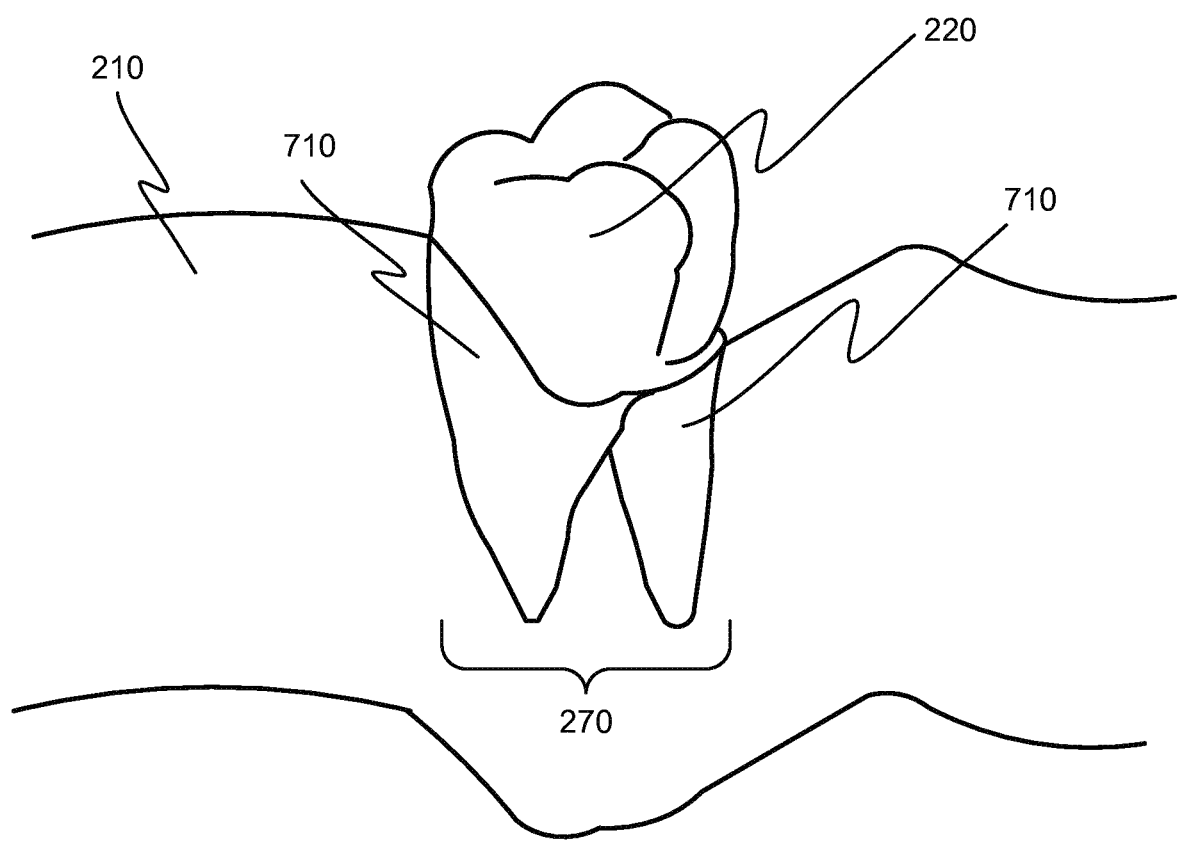
FIG. 7 is a view of an example embodiment of a layered denture having a root approximating structure that simulates anatomical roots.

With reference to FIG. 7, in accordance with one example embodiment, and the principles described herein, a layered denture 200 may comprise a base 210 having a first pocket 270 wherein said first pocket is configured to resemble a root of a tooth wherein a simulated root material 710 may be filled into a said first pocket 270.

Figure 15:
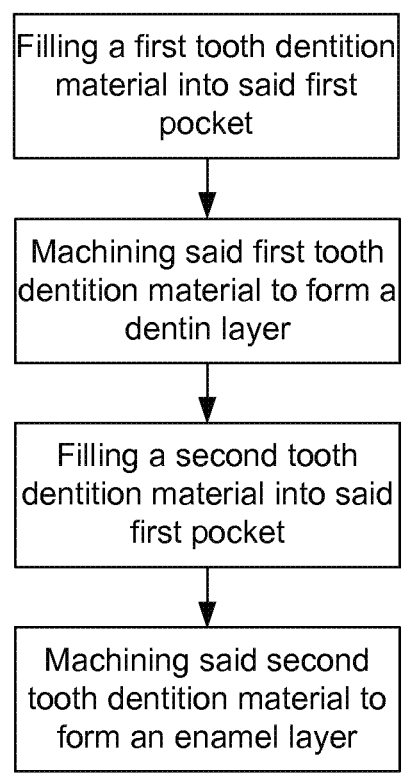
FIG. 15 is a flow chart illustrating an exemplary method of manufacturing a layered denture.
Figure 16:
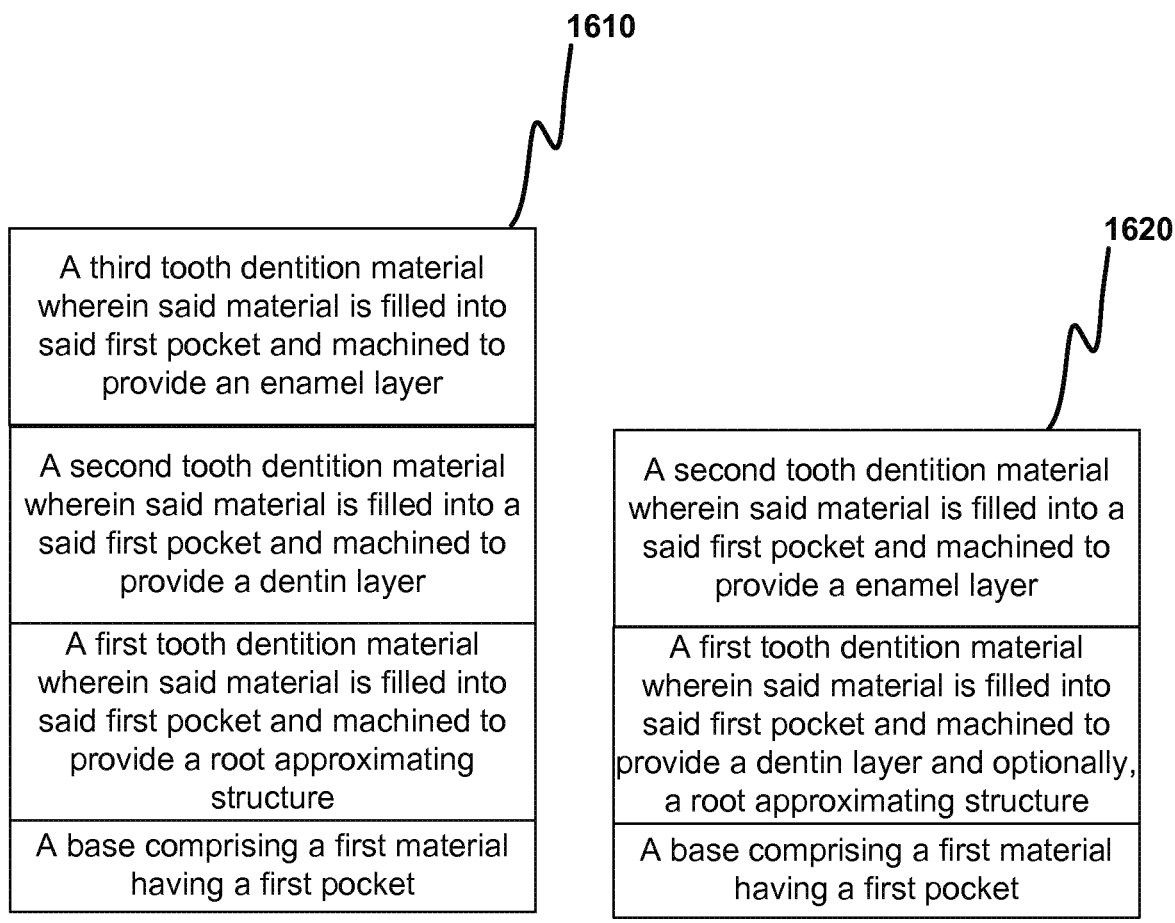
FIG. 16 illustrates functional relationships according to two example embodiments of an artificial dentition structure.

In some example embodiments, said simulated root material 710 provides a surface upon which artificial dentition structure 220 may be mounted. In other example embodiments, said simulated root material is machined to form part of a dentin portion 260 of an artificial dentition structure 220. For example, in some example embodiments (FIG. 16; 1620), said simulated root material 710 may be said earlier described first tooth dentition material filled in to the first pocket of base 200 and machined to provide a dentin layer 260. For example, an artificial dentition structure may comprise a first tooth dentition material wherein said material is filled into said first pocket and machined to provide at least one of a dentin layer and a root approximating structure and a second tooth dentition material wherein said material is filled into said first pocket and machined to provide an enamel layer. In some example embodiments (FIG. 15; 1610), said simulated root material 710 is a different material than said first tooth dentition material. For example, an artificial dentition structure may comprise a first tooth dentition material wherein said material is filled into said first pocket and machined to provide a root approximating structure; a second tooth dentition material wherein said material is filled into a said first pocket, and machined to provide a dentin layer; and a third tooth dentition material wherein said material is filled into said first pocket and machined to provide an enamel layer. Furthermore, an artificial dentition structure may in some example embodiments comprise any number of layers, including for instance, a single layer.

Figure 8:
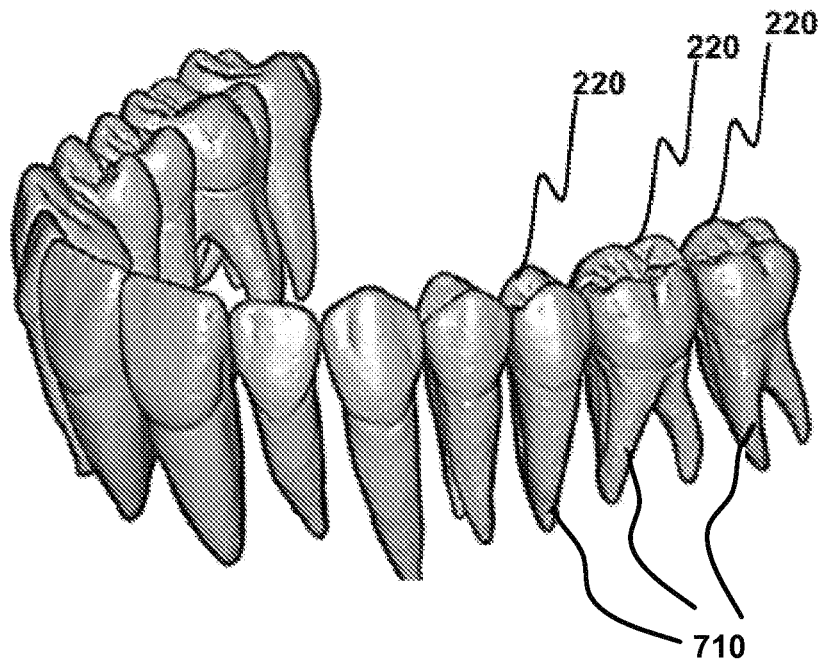
FIGS. 8-10 are cut away views of an example embodiment of a layered denture having a root approximating structure that simulates anatomical roots.

With reference to FIG. 8, in one example embodiment, a plurality of artificial dentition structures 220 are illustrated in conjunction with simulated root material 710, but with base 210 cut away.

Figure 9:
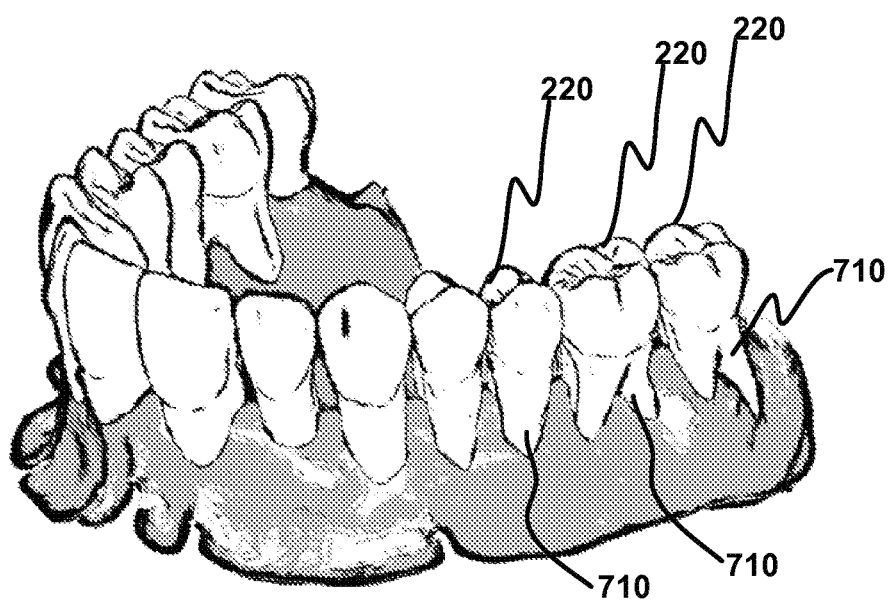

With reference to FIG. 9, in one example embodiment, a plurality of artificial dentition structures 220 are illustrated in conjunction with simulated root material 710, but with base 210 only partially cut away.

Figure 10:
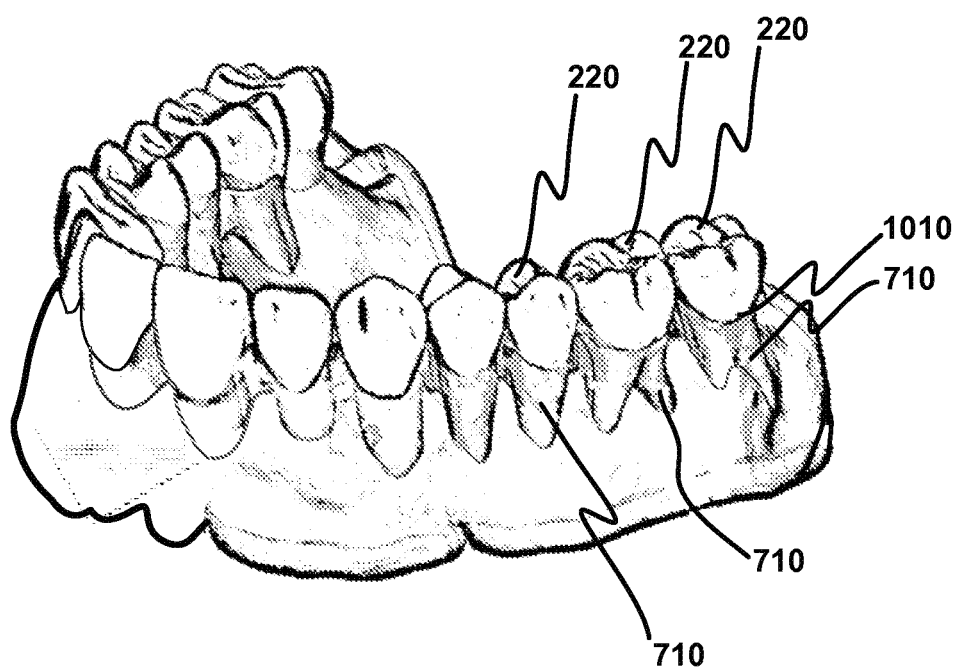

Furthermore, with reference to FIG. 10, a plurality of artificial dentition structures 220 are illustrated in conjunction with simulated root material 710, but with base 210 shaded so as to appear partially transparent. It can be recognized that in this exemplary embodiment, simulated root material 710 extends well below the gum lime 1010.

In addition, it should be noted that exemplary embodiments of a layered denture may include one of a simulated root structure, a support layer and a consideration for balanced occlusion, or any combination of such features. For example, a layered denture may include a support layer with balance occlusion (and without simulated root structure), a support layer with a simulated root structure (without balanced occlusion), a simulated root structure with balanced occlusion (without a support layer, and/or with a convention metal band configuration) or any other arrangement of such features individually or in combination. For purposes of describing the present invention, machining is used to describe the process of removing material from a part. This term, for purposes of the present invention includes but is not limited to milling, 3D printing, grinding, water jetting, laser cutting, electric discharge machining, CNC machining, ultrasonic machining, and any other type of mechanical, chemical, electrical, or other process suitable to conform filled material into to a layer.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "proximate," "proximately," or any other variation thereof, are intended to cover a physical connection, an electrical connection, a magnetic connection, an optical connection, a communicative connection, a functional connection, and/or any other connection. When language similar to "at least one of A, B, or C" is used, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. A method for manufacturing a layered denture comprising:
    configuring a base from a first material to form a first pocket;
    filling a first tooth dentition material into said first pocket;
    machining said first tooth dentition material to form a dentin layer;
    filling a second tooth dentition material into said first pocket;
    configuring said second tooth dentition material to form an enamel layer; and
    defining a motion envelope of a mandible of a patient that is in accordance with a three-dimensional file of the patient so that the dentin layer is offset according to the motion envelope to provide sufficient spacing to achieve balanced occlusion.

2. The method of claim 1, the step of defining the motion envelope further comprising electronically modeling the dentin layer and enamel layers according to the motion envelope, whereby a shape of an outer surface of the enamel layer corresponds to the defined motion envelope.

3. The method of claim 1, the step of defining the motion envelope is further defined in protrusion comprising at least one of the constraints of:
    centric relation and edge-to-edge central incisors, and
    incisal guidance and condylar shape.

4. The method of claim 3, the step of defining the motion envelop is further defined in laterotrusion comprising at least one of the constraints of:
    vertical alignment of buccal cusps of posterior teeth, and
    canine guidance and condylar shape.

5. The method of claim 1 further comprising the steps of:
    configuring a second pocket in the base; and
    filling a reinforcement material in the second pocket to form a support layer.

6. The method of claim 5, further comprising the step of filling a remaining cavity within the second pocket with a second material that comprises a covering layer.

7. The method of claim 1, the step of configuring the first pocket results in the first pocket resembling a root of a tooth.

8. The method of claim 7, further comprising the step of filling a simulated root material into said first pocket, wherein the shape of at least one of the first pocket and the simulated root material is configured to provide sufficient spacing to achieve balanced occlusion, wherein a shape of an outer surface of the enamel layer corresponds to the motion envelope.

9. The method of claim 8, wherein a gum line on an exterior of the layered denture established, the simulated root material extending below the gum line.

10. The method of claim 8, the step of filling a simulated root material into the first pocket, wherein said simulated root material is machined to provide at least one of a dentin layer or an enamel layer, or a root approximating structure.

11. The method of claim 10, wherein the step of machining said first tooth dentition material to form a dentin layer or the step of filling a simulated root material into the first tooth pocket wherein said simulated root material is machined is machined in accordance with three-dimensional digital images of the patient.

12. The method of claim 11, wherein three-dimensional digital images of the patient may be at least one of digital scanning of the patient, a patient's dentures, and bite impressions of the patient.

13. The method of claim 1, wherein the first dentition material is different than the second dentition material.

14. A method for manufacturing a layered denture comprising:
    configuring a base from a first material to form a first pocket;
    filling a first tooth dentition material into said first pocket;
    machining said first tooth dentition material to form a simulated root structure layer and at least part of a dentin layer;
    filling a second tooth dentition material into said first pocket;
    configuring said second tooth dentition material to form an enamel layer; and
    defining a motion envelope of a mandible of a patient that is in accordance with a three-dimensional file of the patient so that the simulated root structure and at least part of a dentin layer is offset according to the motion envelope to provide sufficient spacing to achieve balanced occlusion.

15. The method of claim 14, wherein the shape of at least one of the first pocket and the simulated root material is configured to provide sufficient spacing to achieve balanced occlusion, wherein a shape of an outer surface of the enamel layer corresponds to the motion envelope.

16. The method of claim 14, the step of defining the motion envelope is further defined in protrusion comprising at least one of the constraints of:
   centric relation and edge-to-edge central incisors, and
   incisal guidance and condylar shape.

17. The method of claim 14, the step of defining the motion envelop is further defined in laterotrusion comprising at least one of the constraints of:
   vertical alignment of buccal cusps of posterior teeth, and
   canine guidance and condylar shape.

18. The method of claim 13, wherein a gum line on an exterior of the layered denture established, the simulated root material extending below the gum line.

19. The method of claim 13, the step of filling a simulated root material into the first pocket, wherein said simulated root material is machined to provide at least one of a dentin layer or an enamel layer, or a root approximating structure.

20. The method of claim 13, wherein the simulated root material is a different material than that of the second dentition layer.

\* \* \* \* \*